United States Patent
Liu

(10) Patent No.: US 6,721,579 B2
(45) Date of Patent: Apr. 13, 2004

(54) HAND-FREE HANDSET AND NECKBAND ARRANGEMENT

(76) Inventor: Meng Lin Liu, Room H, 12Fl., 6, Lane 8, Ta Tung Street, Panchiao, Taipei County (TW)

( * ) Notice: Subject to any disclaimer, the term of this patent is extended or adjusted under 35 U.S.C. 154(b) by 490 days.

(21) Appl. No.: 09/880,201

(22) Filed: Jun. 12, 2001

(65) Prior Publication Data

US 2002/0187817 A1 Dec. 12, 2002

(51) Int. Cl.⁷ .............................. H04B 1/38
(52) U.S. Cl. .................. 455/568; 455/569; 455/344; 379/373.02
(58) Field of Search .............. 455/569.1, 568, 455/575.1, 575.6, 66.1, 74, 90.3, 344, 351; 381/370, 374, 375, 380, 378, 309; 379/430, 447

(56) References Cited

U.S. PATENT DOCUMENTS

| | | | |
|---|---|---|---|
| 5,590,417 A | * | 12/1996 | Rydbeck .................. 455/575.2 |
| 6,539,588 B1 | * | 4/2003 | Brosofsky et al. ............. 24/3.4 |
| 2002/0018556 A1 | * | 2/2002 | Okazaki et al. ......... 379/373.02 |
| 2002/0065115 A1 | * | 5/2002 | Lindholm .................... 455/568 |
| 2003/0036414 A1 | * | 2/2003 | Huang ......................... 455/569 |

* cited by examiner

Primary Examiner—Vivian Chin
Assistant Examiner—Minh D Dao
(74) Attorney, Agent, or Firm—Pro-Techtor International Services

(57) ABSTRACT

A hand-free handset and neckband arrangement includes a neckband for hanging on the user's neck, a slide coupled to the neckband and moved to adjust the diameter of the neckband, a swivel hook fastened to the slide, a quick-release plug coupled to the swivel hook, a quick-release socket detachably fastened to the quick-release plug, the quick-release plug being provided with a loop for holding a cellular telephone, and a hand-free handset installed in the neckband for enabling the user to use the cellular telephone with the hands free for doing things.

1 Claim, 1 Drawing Sheet

HAND-FREE HANDSET AND NECKBAND ARRANGEMENT

BACKGROUND OF THE INVENTION

The present invention relates to a hand-free handset and, more particularly, to a hand-free handset and neckband arrangement, which enables the user to hang a cellular telephone on the neckband and to use the cellular telephone without holding it with the hands.

In offices or certain facilities, people may be required to carry an ID card on the front side. Further, when using a cellular telephone, one may have to stop handling things because one must use one hand to hold the cellular telephone. In certain conditions, one may have to handle things with the hands while listening to a cellular telephone. In this case, a hand-free handset is required.

SUMMARY OF THE INVENTION

The present invention has been accomplished under the circumstances in view. It is one object of the present invention to provide a hand-free handset and neckband arrangement, which enables the user to carry a cellular telephone and an ID card on a neckband. It is another object of the present invention to provide a hand-free handset and neckband arrangement, which enables the user to use a cellular telephone without holding it with the hand. According to the present invention, the hand-free handset and neckband arrangement comprises a neckband, and a hand-free handset installed in the neckband. The neckband has a swivel hook at one end adapted to hold an ID card, a quick-release plug fastened to the swivel hook, and a quick-release socket with an attached loop detachably fastened to the quick-release plug and adapted to hold a cellular telephone.

BRIEF DESCRIPTION OF THE DRAWINGS

FIG. 1A is an enlarged view of a part of FIG. 1.

DETAILED DESCRIPTION OF THE PREFERRED EMBODIMENT

Figure 1:
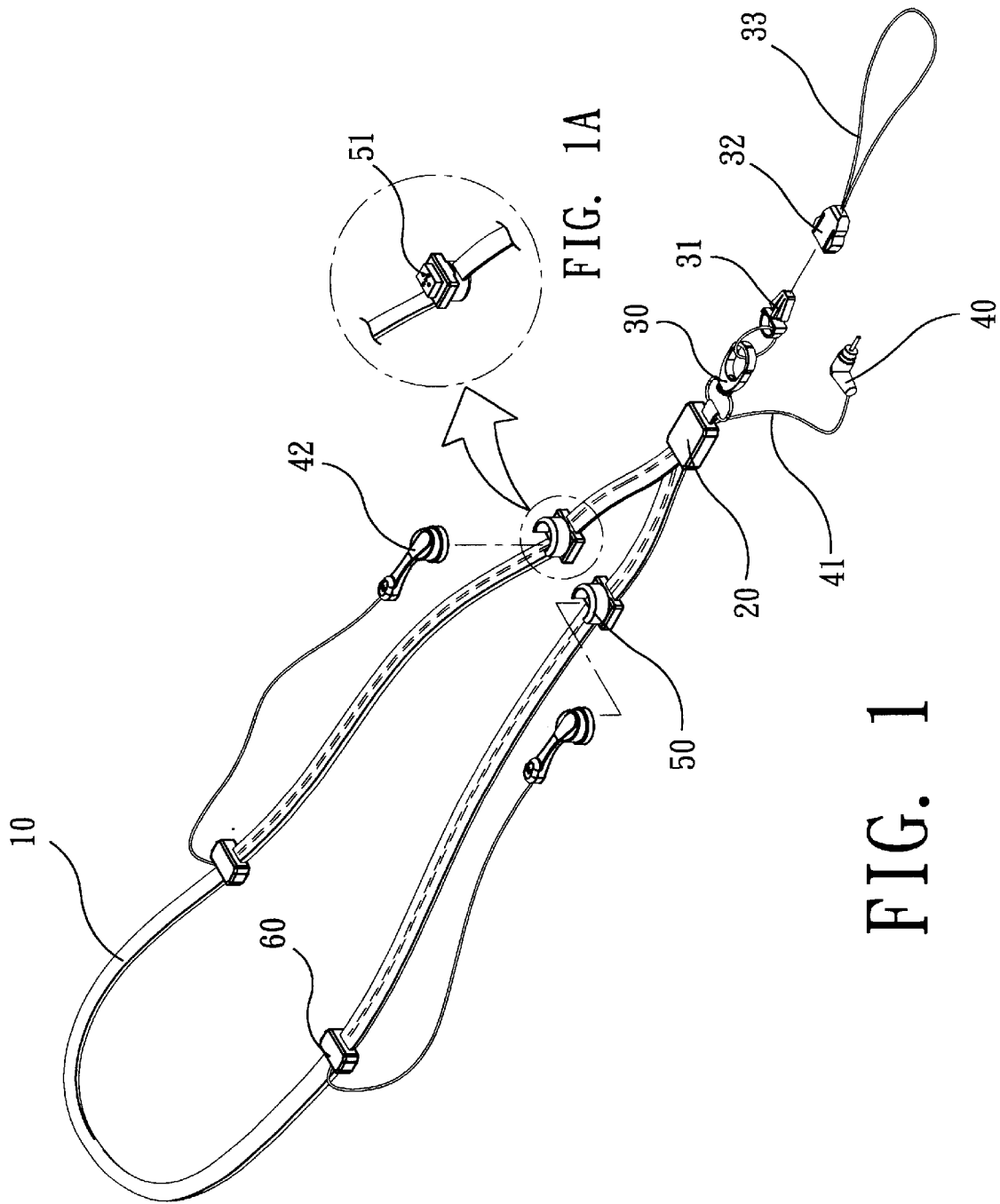
FIG. 1 illustrates a hand-free handset and neckband arrangement constructed according to the present invention.

Referring to FIG. 1 and FIG. 1A, a hand-free handset and neckband arrangement in accordance with the present invention is shown comprising a neckband 10 for hanging on the user's neck, a slide 20 coupled to the neckband 10 and moved to adjust the diameter of the neckband 10, a swivel hook 30 fastened to the slide 20, a quick-release plug 31 coupled to the swivel hook 30, and a quick-release socket 32 detachably fastened to the quick-release plug 31. The quick-release plug 32 is provided with a loop 33 for holding a cellular telephone. The hand-free handset and neckband arrangement further comprises a hand-free handset installed in the neckband 10. The hand-free handset comprises an electric plug 40 for connection to the input/output jack of a cellular telephone or audio equipment, left and right earphones 42, an electric cable 41 inserted through the slide 20 and connected between the electric plug 40 and the earphones 42, two cable clamps 60 respectively fastened to the neckband 10 at two sides to secure the left and right connecting cables of the electric cable 41 in place (the electric cable 41 has one end connected to the electric plug 40 and the other end terminating in left and right connecting cables respectively connected to the earphones 42), two earphone holders 50 respectively mounted on the neckband 10 at two sides adjacent to the slide 20 and adapted to hold the earphones 42 when not used, and a microphone 51 installed in one earphone holder 50 and electrically connected to the electric cable 41.

When in use, the user can fasten an ID card, cellular telephone, mobile audio apparatus, or the like to the loop 33 or the swivel hook 30. When a cellular telephone is used, the electric plug 40 can be inserted into the signal input/output jack of the cellular telephone, so that the user can use the cellular telephone through the microphone 51 and the earphones 42 with the hand free for doing other things.

A prototype of hand-free handset and neckband arrangement has been constructed with the features of FIGS. 1 and 1A. The hand-free handset and neckband arrangement functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A hand-free handset and neckband arrangement comprising a neckband for hanging on the user's neck, a slide coupled to said neckband and moved to adjust the diameter of said neckband, a swivel hook fastened to said slide, a quick-release plug coupled to said swivel hook, a quick-release socket detachably fastened to said quick-release plug, said quick-release plug being provided with a loop for holding a cellular telephone, and a hand-free handset installed in said neckband, said hand-free handset comprising an electric plug for connection to the input/output jack of a cellular telephone or audio equipment, left and right earphones, an electric cable inserted through said slide and connected between said electric plug and said earphones, two cable clamps respectively fastened to said neckband at two sides to secure left and right connecting cables of said electric cable in place, two earphone holders respectively mounted on said neckband at two sides adjacent to said slide and adapted to hold said earphones when not used, and a microphone installed in one of said earphone holders and electrically connected to said electric cable.

* * * * *